United States Patent

[11] 3,596,587

| [72] | Inventor | James E. Klinger<br>5714 S. 114th St., Hales Corners, Wis.<br>53130 |
|---|---|---|
| [21] | Appl. No. | 826,331 |
| [22] | Filed | May 21, 1969 |
| [45] | Patented | Aug. 3, 1971 |

[54] OFFTAKE FOR COOKING EQUIPMENT
4 Claims, 3 Drawing Figs.

[52] U.S. Cl. ................................................ 98/115,
126/299
[51] Int. Cl. .................................................... F23j 11/00
[50] Field of Search ........................................... 98/115, 115
K; 126/299, 300

[56] References Cited
UNITED STATES PATENTS

| 3,021,777 | 2/1962 | Smith | 98/115 |
| 3,164,445 | 1/1965 | Hzmpel | 126/299 X |
| 3,247,776 | 4/1966 | Gaylord | 98/115 |

*Primary Examiner*—Meyer Perlin
*Attorney*—John J. Byrne

ABSTRACT: A cooking equipment offtake comprising hood, duct and related appurtenances with attached heating means for raising the inner surface temperature of said offtake and thus preventing the condensation of grease thereon.

PATENTED AUG 3 1971

3,596,587

INVENTOR
JAMES E. KLINGER
BY Ballard and Byrne
ATTORNEYS

OFFTAKE FOR COOKING EQUIPMENT

This invention relates generally to a cooking equipment offtake and more particularly to a cooking equipment offtake having means to prevent the condensation of grease on the inner walls of ducts and surfaces forming part of the offtake.

It is a primary object of this invention to eliminate the fire hazard prevalent in offtakes for cooking equipment. The fire hazard arises by the collection of grease on the interior walls of the hood and ducts used in offtake systems. In conventional practice, hot air, containing vaporized grease, leaves the surface of the cooking equipment where it is collected by a range hood and then enters suitable conduits or ducts for transmission to the outside of the building in which the cooking equipment is located. This flow of hot air and vaporized grease is usually assisted by an exhaust fan in communication with the hood and ducts. The vaporized grease tends to condense on the relatively cool inner wall surfaces of the offtake. Over a period of time the grease builds up to a heavy covering on the surfaces. This accumulation is further promoted by the frictional contact of the inner wall surfaces and the layer of hot air and vaporized grease adjacent the surfaces. As the initial layer condenses, the next layer condenses and so on until there is a heavy accumulation of grease on the surfaces of the ducts. This creates a substantial fire hazard and it is quite common for the accumulated grease to ignite.

The most common means used in the prior art to alleviate the problem of grease accumulation is to provide a filter in the offtake hood. The hoods are normally located adjacent the exhaust fan for purposes of collecting particles of grease emitted from the upper surface of the cooking equipment. It is known, however, that filters are not entirely successful in that only the large particles of grease are collected, whereas the small vapor particles of grease pass through the filter elements into the hood and ducts and accumulate on the inner surfaces as explained above.

Other more sophisticated attempts have been made to prevent the accumulation of grease in the ducts. One such attempt is the provision of a heated drum in the airflow adjacent the point where the hood and duct join. The drum is used to direct the hot air and vaporized grease into a suitable grease-collecting receptacle. The purpose of heating the drum is to prevent condensation on the drum itself. However, the problem with regard to the accumulation of grease on internal surfaces of the ducts is not eliminated in this system.

Other systems are directed to the dissolution of the accumulated grease after the grease has collected or condensed on the duct walls. Complicated systems have been provided wherein steam is sprayed on the accumulated grease for purposes of dissolving it with means being provided for collecting the dissolved grease. It is difficult in such a system to clean the entire duct system where for example the duct system is lengthy. Further there are situations whereby the ducts must follow a rather sinuous path in order to reach the exterior of the building.

It is an object of this invention to provide a simply constructed offtake for use with cooking equipment wherein the inner surfaces of the offtake throughout its length have heating means for purposes of raising the temperature of the walls for precluding the condensation of vaporized grease thereon.

It is a further object of this invention to provide an offtake having electrical elements disposed therein for purposes of heating the walls as mentioned in the preceding paragraphs.

A further object of the invention is to provide heat exchange fluid, for example, in lieu of the electrical heating means.

It is a further object of this invention to provide automatic sensing means for controlling the application of heat to the ductwork.

It is to be understood that the main concept of this invention is to prevent condensation on the inner surface of the walls of the hood and ducts of the offtake by heating said walls. Suitable means on the exterior of the building may be used to collect the vaporized grease exiting from the ductwork. It is to be understood that such means may be used in combination with this invention to prevent air pollution or a fire hazard at the ducts' area of exhaust.

These and other objects of the invention will become more apparent to those skilled in the art by reference to the following detailed description when viewed in light of the accompanying drawings wherein.

Figure 1:
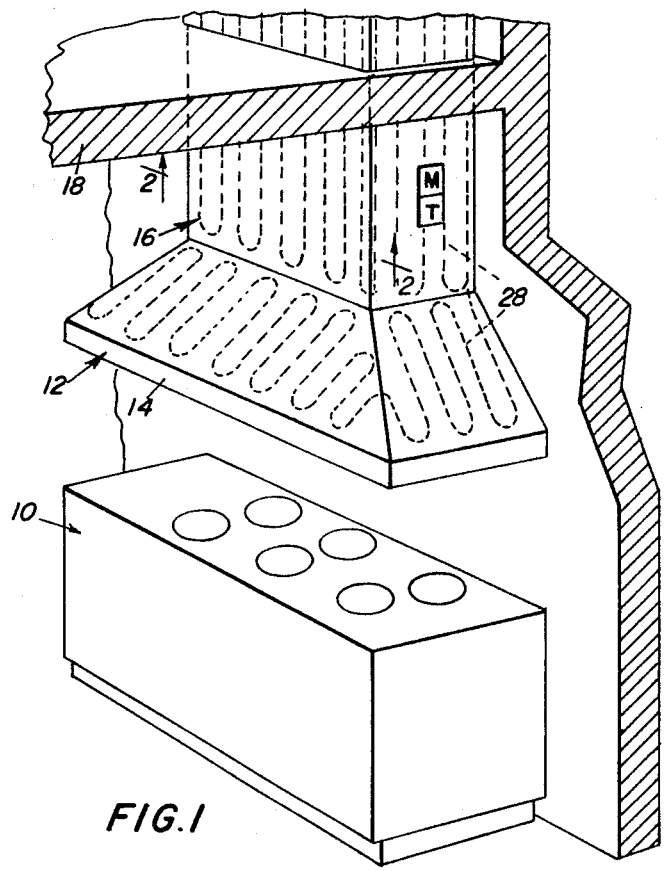
FIG. 1 is a perspective of the offtake of the subject invention positioned above a cooking range.

Referring now to the drawings wherein like numerals indicate like parts, 10 is a cooking range shown schematically. Positioned immediately over the cooking range is an offtake generally indicated by the numeral 12. The offtake includes a hood 14 and duct 16 extending through the ceiling 18. It is to be understood that the duct continues to a point of egress from the building interior at which point, as mentioned earlier in the specification, suitable means may be provided for trapping vaporized grease precluding unfavorable pollution of the atmosphere.

The duct of this invention generally indicated by the numeral 16 comprises an outer duct 20 and an inner duct 22, forming a passageway 24. In the space between the inner duct and the outer duct insulation 26 is provided to protect surfaces coming in contact with the duct 16 from being harmed by the heat present therein. Further, the insulation facilitates the heating of the walls and minimizes the amount of heat required. The insulation may consist of any suitable heat insulation material well known to those skilled in the art. Further, both the inner and outer ducts may be of any suitable material sufficient to withstand the heat but preferably they should be of the sheet metal commonly used for duct work.

Figure 2:
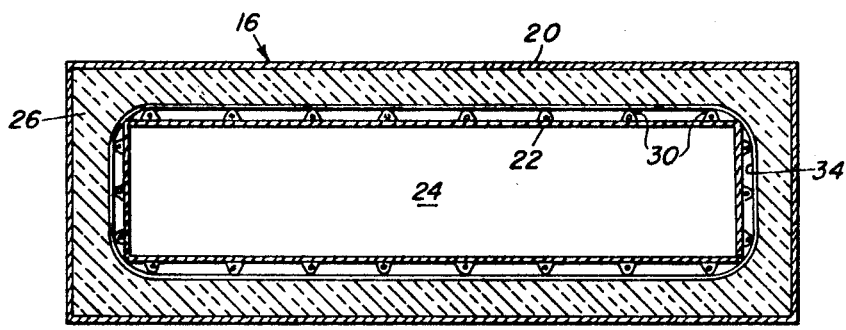
FIG. 2 is a cross-sectional view of the duct of FIG. 1 taken along lines 2-2 thereof.
Figure 3:
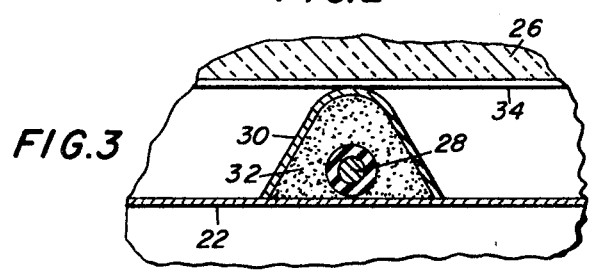
FIG. 3 is a blowup of the channel housing the electrical heating element taken from FIG. 2.

Heating means are provided along the inner duct 22 in the form of electrical resistance heating elements 28 shown in broken lines in FIG. 1 and as shown in cross section in FIGS. 2 and 3. The heating elements are positioned adjacent the walls of the inner duct by means of channel members 30 and heat transfer cement 32. The channel members 30 are maintained in place about the inner duct by means of retention bands 34. The heating elements 28 are shown in the figures as extending generally longitudinally of the ducts shown therein, however, it is to be understood that the heating elements may also extend transversely or helically of the length of the ducts. Suitable means not shown are provided for making an electrical connection with a suitable supply of electricity. A control thermostat T is positioned on the upper portion of the hood 14. Control of the inner surface temperature of the offtake is accomplished by means of thermostat T which interrupts the electrical circuit to the heating elements when a predetermined inner surface temperature is reached. The inner surface temperature of the offtake system is maintained above the condensation temperature of the grease-laden vapor. Additional controls may be provided as required by regulatory electrical codes or as operating conditions warrant. As shown in FIG. 1, the hood 14 may also include heating elements for the same purpose as heretofore described.

In operation, the offtake system is turned on either manually or automatically, completing a circuit between a source of electricity and the heating elements. The offtake system can be energized manually by means of a simple on-off switch. Also, the system may be energized automatically for predetermined intervals by use of a clock-controlled switch or the system can be electrically interlocked to the cooking equipment controls or the exhaust fan switch. In this manner, the system will automatically be in operation at anytime the cooking equipment was in operation. Grease in the form of vapor passes through the cooking range hood 14, and passes through the top portion of the hood and through the duct 16 which may be provided with a suitable exhaust fan and eventually through suitable exit means provided on the exterior of the building. During the course of travel of the vaporized grease through the duct system grease will not condense on the inner surfaces of the duct walls which are heated and maintain the grease in its vaporized state. When the inner surfaces of the offtake system reach a predetermined temperature above the condensation point of the vapor, the control thermostat T switch opens, interrupting the heat source thereby maintaining a constant temperature on the surface of the inner walls. A limit thermostat, shown schematically as M, may be provided, which is set at a higher temperature than the control thermostat T. In the event of a failure of the control thermostat T, the limit thermostat M would open, shutting off power to the heating system. A signal light or warning device would indicate the opening of the limit thermostat M. A manual reset switch could be provided to reset the system prior to being energized again. Control systems could be provided as required by regulatory codes or as operating conditions indicate. The basic requirements pertaining to the invention are double-wall construction with insulation and heating device with control thermostat T for monitoring predetermined inner surface temperature. As mentioned previously, suitable means may be provided on the exterior of the building for condensing and accumulating grease exiting therefrom in order to prevent pollution of the atmosphere.

As an alternative to the structure described, a system embodying conduits or heat exchange tubing can be positioned similarly to the electrical heating elements shown in the drawings for purposes of transferring heat therethrough by means of a heat exchange fluid. Such system can also be operated automatically by means of a thermostat controlling suitable valves permitting the introduction of steam or the like to the heat exchange tubing.

Further, the duct 16 may be constructed in sections of predetermined length having an electrical connection on each end. A number of such sections may be purchased and joined together in accordance with the distance to be covered from the cooking range to the exterior of the building.

I claim

1. An offtake system for the removal of vaporized grease from cooking equipment enclosed by a building structure to a remote point of egress comprising, hood means gathering the vaporized grease developed at said equipment, duct means extending through said structure and communicating said hood to said point of egress, said duct means comprising an inner channel and an outer channel in spaced relationship therewith, heat means for raising the temperature of the surfaces of said duct to a level precluding the depositing of condensed grease thereon as vaporized grease moves therethrough, said heat means being disposed in the space defined by said inner and outer channels of said duct means, and means insulating said structure from said heated duct.

2. The offtake system of claim 1 wherein said heating means are electrical resistance heating elements positioned closely adjacent said inner channel and in the space defined between said inner and outer channels.

3. The offtake system of claim 1 wherein said hood means comprises inner and outer walls in spaced relationship and heat means disposed between said walls wherein said heat means raises the temperature of the surfaces of said hood to a level precluding the depositing of condensed grease thereon as vaporized grease moves therethrough.

4. The system of claim 1 wherein said heating means are adjacent said inner channel and insulating material is disposed between said heating means and said outer channel.